E. ENNIS.
WASTE FITTING FOR FOUNTAIN CUSPIDORS.
APPLICATION FILED MAY 4, 1918.
1,299,441.
Patented Apr. 8, 1919.
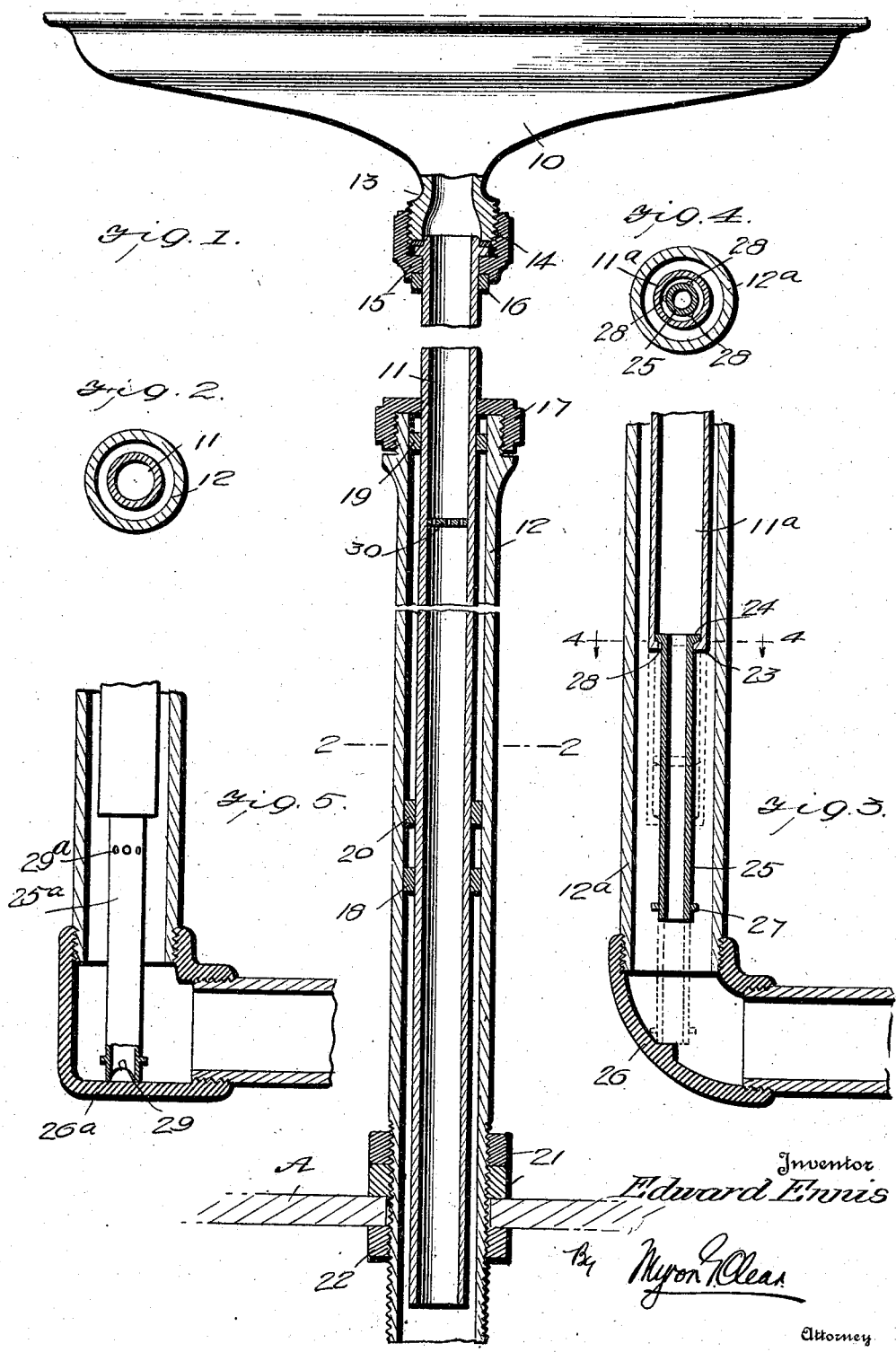

UNITED STATES PATENT OFFICE.

EDWARD ENNIS, OF NORTH CAMBRIDGE, MASSACHUSETTS.

WASTE-FITTING FOR FOUNTAIN-CUSPIDORS.

1,299,441. Specification of Letters Patent. Patented Apr. 8, 1919.

Application filed May 4, 1918. Serial No. 232,460.

*To all whom it may concern:*

Be it known that I, EDWARD ENNIS, a citizen of the United States, and a resident of North Cambridge, in the county of Middlesex and State of Massachusetts, have invented certain new and useful Improvements in Waste-Fittings for Fountain-Cuspidors, of which the following is a specification.

My present invention relates generally to waste fittings for fountain cuspidors, and more particularly to waste fittings for fountain cuspidors for use in connection with vertically adjustable dental chairs and the like which, on account of their vertical movement or adjustment, require either flexible waste fittings, or those having relatively movable parts.

The primary object of my present invention is the provision of a strong, durable structure which will be highly sanitary, owing both to its maintenance in cleanly condition and its avoidance of all odors, and one which will at the same time allow for vertical movement of the chair without undue friction.

In the accompanying drawings illustrating my invention,

Figure 1 is a side view, partly in elevation, and partly in vertical longitudinal section.

Fig. 2 is a detail transverse section taken on the line 2—2 of Fig. 1.

Fig. 3 is a vertical longitudinal section through a portion of a modified form.

Fig. 4 is a detail horizontal section taken on the line 4—4 of Fig. 3, and

Fig. 5 is another vertical longitudinal section through a portion of an apparatus illustrating another slightly modified form.

Referring now to these figures, my invention proposes a waste fitting for fountain cuspidors, of which the bowl is generally indicated at 10 in Fig. 1, which consists of inner and outer telescoping pipes 11 and 12, respectively, the inner pipe 11 being secured at its extreme upper end to the depending nipple 13 of the bowl 10 by means of a gasket nut 14 having adjacent the same an annularly grooved collar 15, the lower groove of which receives and supports a washer 16 which projects below the ring 15 and fits snugly around the pipe 11 for a purpose which will be presently described.

I have clearly shown in Fig. 1 that the pipe 11 has a materially reduced diameter as compared to the pipe 12 within which it telescopes, coaxial relation of these two pipes being maintained, although spaced apart, by virtue of an upper gasket nut 17 which threads on the upper end of the outer pipe 12 and which has an opening of the diameter of the pipe 11, through which the latter leads. The spaced co-axial relation of these pipes is also maintained by a spacing ring 18 which is set into the outer pipe 12 at a point materially below the upper end thereof, the inner diameter of which ring corresponds with the outer diameter of the inner pipe 11, so that the latter in its vertical movements with the bowl 10, which bowl is as usual secured in any suitable manner to a dental chair, will be effectively guided, the upper gasket nut 17 of the outer pipe 12 forming a seat for the flexible washer 16 at the upper end of the inner pipe 11 when the parts are in lowermost position, so as to effectively prevent exit of any odors which may have collected in the space between the inner and outer pipes 11 and 12.

Between the gasket nut 17 at the upper end of the outer pipe and the lower inner guide ring 18, the inner pipe 11 is provided with a pair of washers 19 and 20, both of which move with the pipe 11, the washer 19 coöperating with the lower inner surface of the gasket nut 17 as a seat when the bowl 10 and pipe 11 are raised, and washer 20 similarly coöperating with the upper surface or ring 18 when the said parts are lowered, both for the purpose of effecting seals against all odors.

It is intended that the pipe 11 shall, as seen in Fig. 1, be extended at its lower end a sufficient depth within the outer pipe to avoid the discharge of fluid matter against any portion of the inner surface of the outer pipe 12 from which such fluid might in turn be deposited upon that portion of the outer surface of the inner pipe 11 which projects at any time above the gasket nut 17 at the upper end of the outer pipe. This can be done very readily where the waste fitting can be extended vertically and downwardly through a floor as seen at A in Fig. 1, to which the lower threaded portion of the outer pipe 12 is locked by nuts 21 and 22.

It is obvious it would be difficult to do this however, where the waste fitting is installed on the upper surface of the floor and in order to bring about substantially the same result, I may provide the inner lower end of the inner pipe 11ª as seen in Fig. 3, with an inwardly projecting flange 23, the upper surface of which is beveled to coöperate and form a snug joint with the lower beveled surface of the external flange 24 at the upper end of a depending movable telescoping extension pipe 25, the latter of which projects downwardly from the lower inner end of the pipe 11ª into the lower portion of the outer pipe 12ª. Thus when the inner pipe is elevated as seen in Fig. 3, the extension pipe 25 lowers by its own weight and the flanges 23 and 24 come into engagement with one another so that the fluid matter will be discharged into the very lowermost portion of the outer pipe 12, and when the inner pipe 11ª is lowered, the lower end of the extension pipe 25 will engage the elbow 26 or other fitting at the lower end of the pipe 12ª, and will yield vertically within the inner pipe 11ª as the latter continues to move downwardly to the full length of its stroke.

The extension pipe 25 is preferably provided with an external annular flange or rib 27 adjacent its lower end which will prevent its accidental movement upward into the pipe 11ª beyond the flange 23, and the last mentioned flange may, if it is found necessary, be provided with recesses 28 around the extension pipe 25, and as best seen in Fig. 4, in order to provide for the ready discharge of any fluid which may have found its way past the flange 24 and into the space between the flanges 23 and 24, when the extension pipe 24 is elevated within the pipe 11ª in the position shown in dotted lines in Fig. 3.

In case a square or other exposed connection 26ª is utilized at the lower end of the outer waste pipe of Fig. 4, the extension pipe 25ª, as seen in this figure, may be concaved as seen at 29 in order to provide for free discharge of fluid therefrom in its lowermost position in engagement with the connection 26ª.

It is obvious from the foregoing that my invention is susceptible of various slight modifications and changes without departing from its spirit, and it is equally obvious that in either of the forms herein shown and described, my invention is capable of effective and efficient use for the intended purpose and the particular construction proposed will maintain the outer surface of that portion of the inner pipe which may be exposed above the upper end of the outer pipe when the dental chair is elevated, in a cleanly sanitary condition much to be desired particularly in dental offices where a neat clean appearance is not only to be desired, but is essential.

It is also to be observed that in thus providing for a clean, neat appearance by the spacing of the telescoping pipes with respect to one another, my invention proposes allied improvements whereby to avoid the danger of discharge of odors which might otherwise freely take place by virtue of such spacing.

My invention is intended to displace all flexible hose connections, and the like which are now in wide use and which, particularly after considerable wear, are in more or less perforate condition and are both insanitary and unsightly in condition and appearance.

If desired, the extension pipe may have openings 29ª through its wall intermediate its ends, to let fluid out of the space between flanges 23 and 24, as seen in Fig. 5, and the inner pipe 11 may have an internal perforate plate 30 as seen in Fig. 1 which will obviate noise in the falling of fluid through the pipe.

It is to be understood, of course, that any suitable means may be utilized to secure the bowl 10 and pipe 11 to a dental chair and the like.

I claim:

1. A waste fitting for fountain cuspidors, consisting of inner and outer telescoping pipes in spaced relation, the outer pipe having guides for the inner pipe in its relative movement one of which guides is in the form of a gasket located at the upper end of the outer pipe and closing the space between the pipes, the inner pipe having an annular grooved ring adjacent its upper outer end, and a washer supported in the groove of the ring and projecting below the latter for engagement with the gasket of the outer pipe when the inner pipe is in its lowermost position.

2. A waste fitting for fountain cuspidors, consisting of a pair of telescoping pipes in spaced relation of which the inner pipe is movable vertically, and the outer pipe is provided with vertically spaced guides for the inner pipe to maintain the pipes in coaxial relation forming a uniform annular space between them, said inner pipe being provided with washers therearound and movable therewith between the guides of the outer pipe and for coöperation of the latter in the upper and lower positions of the inner pipe to seal the said annular space and prevent discharge of odors.

3. A waste fitting for fountain cuspidors, comprising a pair of telescoping pipes in spaced relation of which the outer pipe is stationary and the inner pipe is movable, a telescoping extension pipe at the inner end of the movable inner pipe, and means for limiting the movement of the extension pipe with respect to the inner pipe for the purpose described.

4. A waste fitting for fountain cuspidors, comprising a pair of telescoping discharge pipes arranged in spaced co-axial relation, means for guiding the inner pipe in its movement, and a telescoping extension pipe at the lower end of the inner pipe, said inner pipe and its extension pipe having relatively engaging flanges limiting the movement of the extension pipe with respect to the inner pipe.

5. A waste fitting for fountain cuspidors, comprising an outer stationary pipe, an inner pipe telescoping within the outer pipe in spaced relation and provided with an inwardly projecting annular flange at its lower end, guides for the inner pipe in its movement, and an extension pipe at the inner end of the inner pipe and having a flange at its upper end within the inner pipe to coöperate with the lower inner flange of the latter, the engaging surfaces of said flanges bing beveled to form a snug joint in the engaged position.

6. A waste fitting for fountain cuspidors, comprising an outer stationary pipe, an inner pipe telescoping within the outer pipe in spaced relation and provided with an inwardly projecting annular flange at its lower end, guides for the inner pipe in its movement, and an extension pipe at the inner end of the inner pipe and having a flange at its upper end within the inner pipe to coöperate with the lower inner flange of the latter, the said flange of the inner pipe having recesses around the extension pipe to provide for the ready escape of fluid from the space between the flanges.

In testimony whereof I affix my signature.

EDWARD ENNIS.

Copies of this patent may be obtained for five cents each, by addressing the "Commissioner of Patents, Washington, D. C."